Dec. 18, 1951 R. F. COLLINS 2,579,364
ELEVATOR MECHANISM
Filed May 24, 1948 4 Sheets-Sheet 1

Inventor
Robert F. Collins
by Harry L. Yunger
Attorney

Witness
Edward P. Seeley

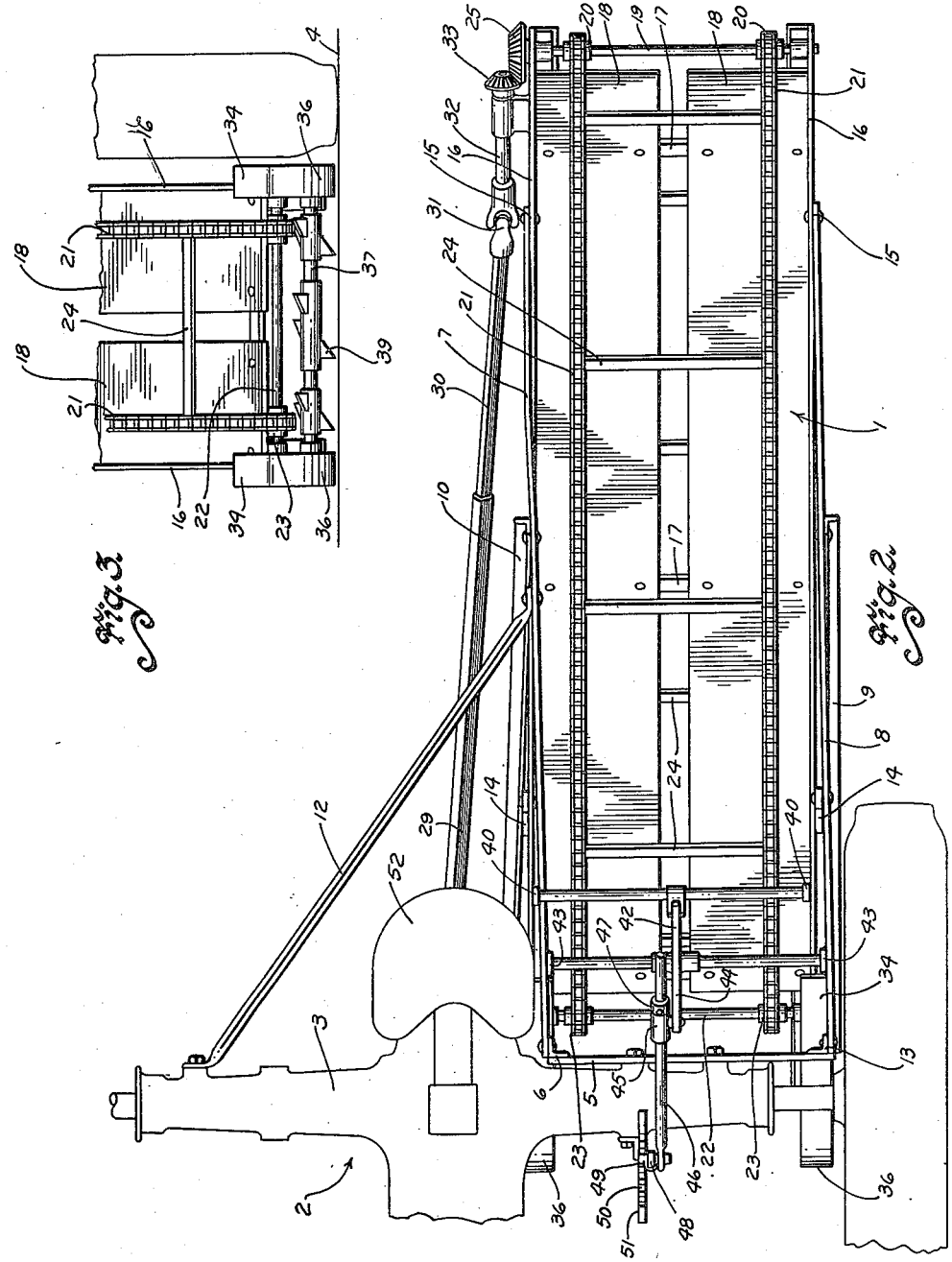

Dec. 18, 1951     R. F. COLLINS     2,579,364
ELEVATOR MECHANISM
Filed May 24, 1948     4 Sheets-Sheet 3
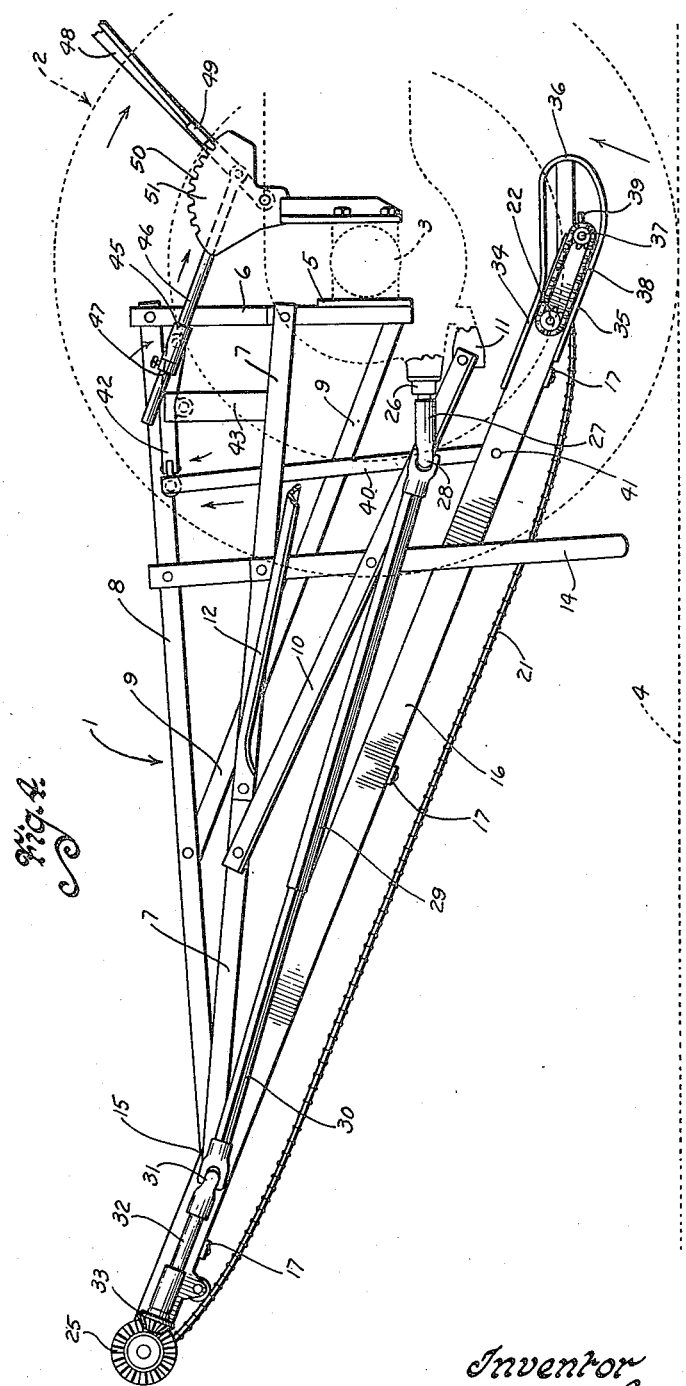
Inventor
Robert F. Collins
by Harry L. Yunger
Attorney
Witness
Edward P. Seeley

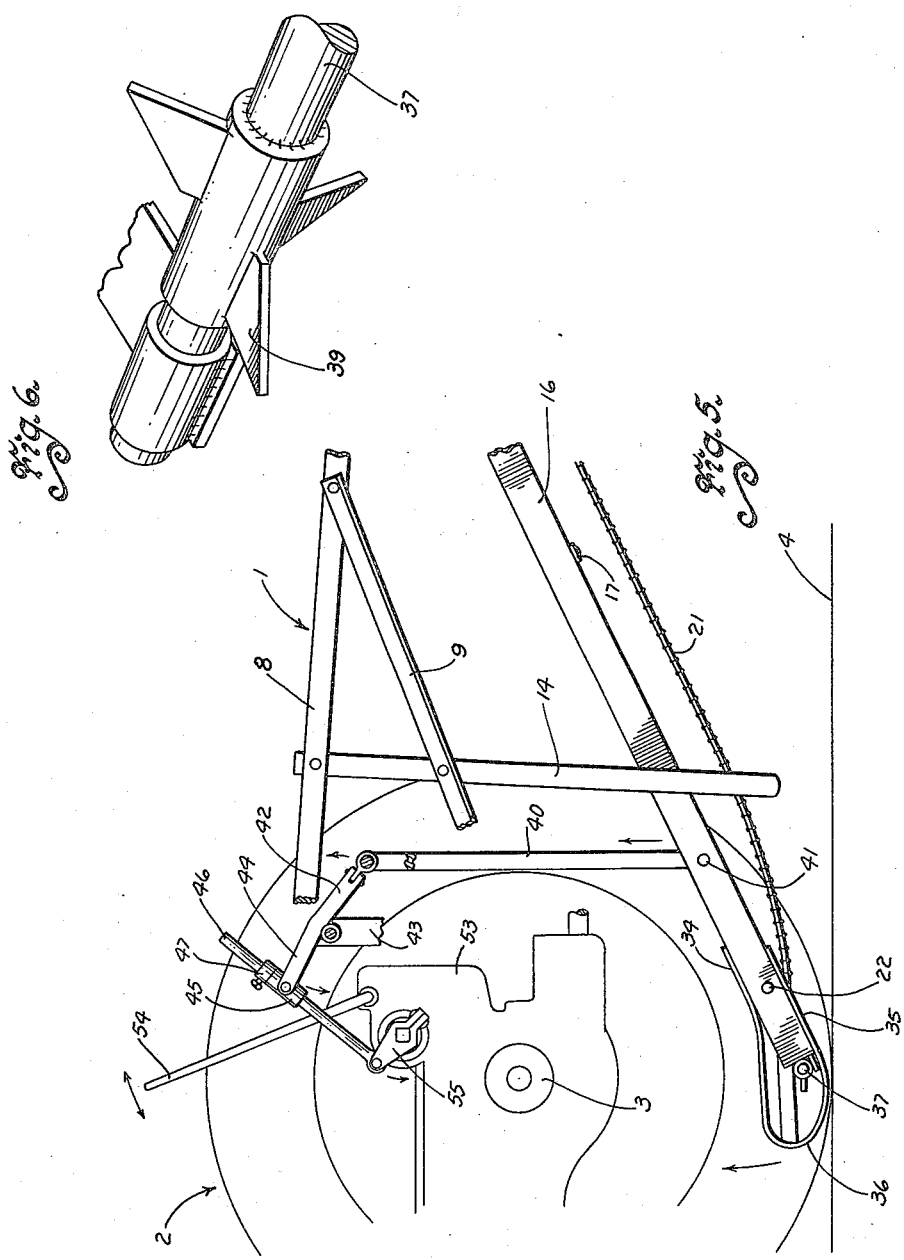

Patented Dec. 18, 1951

2,579,364

UNITED STATES PATENT OFFICE 2,579,364

ELEVATOR MECHANISM

Robert F. Collins, Seymour, Iowa

Application May 24, 1948, Serial No. 28,872

1 Claim. (Cl. 198—123)

This invention relates to an elevator mechanism and more particularly to an elevator to be mounted on the rear of a tractor and is advantageous in loading hay bales on a hay rack.

In harvesting hay, the hay is mowed and allowed to cure in the field after which a hay baler is taken into a field to bale the hay. The hay baler picks the hay up off the ground, compacts the hay and discharges a hay bale onto the ground. The hay bale is approximately 16 to 18 inches in width and depth and about 36 inches long. The baled hay must be picked up from the ground and elevated to a hay rack to be transported to a barn or a protected area. It is with the problem of elevating baled hay to a hay rack that the present invention is concerned.

It is an object of the invention, among others, to provide an elevator mechanism that is attached to the rear of a tractor, becomes a part of the tractor and is powered from the tractor.

It is another object of the invention to provide an elevator that may be attached to or removed from a tractor by one man in a very short period of time so the tractor will not be tied up in its use with an elevator alone.

It is a further object of the invention to provide an elevator to be mounted on the rear of a tractor in such a manner that a bale of hay in passing upwardly will pass between the rear axle of the tractor and the surface of the ground.

It is a still further object of the invention to provide an elevator wherein one man can operate the tractor and elevator mechanism but a second man is needed on the hay rack to receive the bales and arrange them on the hay rack. The tractor on which the elevator mechanism is mounted is used to tow the hay rack when loaded simply by elevating the forward end of the elevator mechanism.

It is a still further object of the invention to provide an elevator that can easily be adapted and mounted on any type or model of tractor; an elevator that is simple in construction and operation, easy to operate and economical both in construction and operation; an elevator that is long lasting and durable in operation, requiring less repair and lost time in operation; an elevator that is easy to operate, simple in design and easy of repair in case of breakdown; an elevator requiring no special skill to mount on a tractor; an elevator easy of repair in case of breakdown in that any piece or part is available for replacement; and an elevator that can be supplied at a low cost.

With the foregoing and other objects in view, the invention will be more fully described hereinwith and will be particularly pointed out in the claim appended hereto.

In the drawings, wherein like symbols refer to like or corresponding parts throughout the several views:

Figure 2 is a top plan view of the elevator and the rear of a tractor.

Figure 3 is a front view of the lower forward end of the elevator showing the means for starting a bale of hay or like onto the elevator.

Figure 4 is an elevation view of the elevator with the rear of a tractor shown in dotted line taken from the side opposite to that shown in Figure 1.

Figure 5 shows another species of lifting means to lift the forward end of the elevator.

Figure 6 is an enlarged view of a shaft journaled on the forward end of the elevator to guide hay bales to the elevator mechanism.

Figure 1:
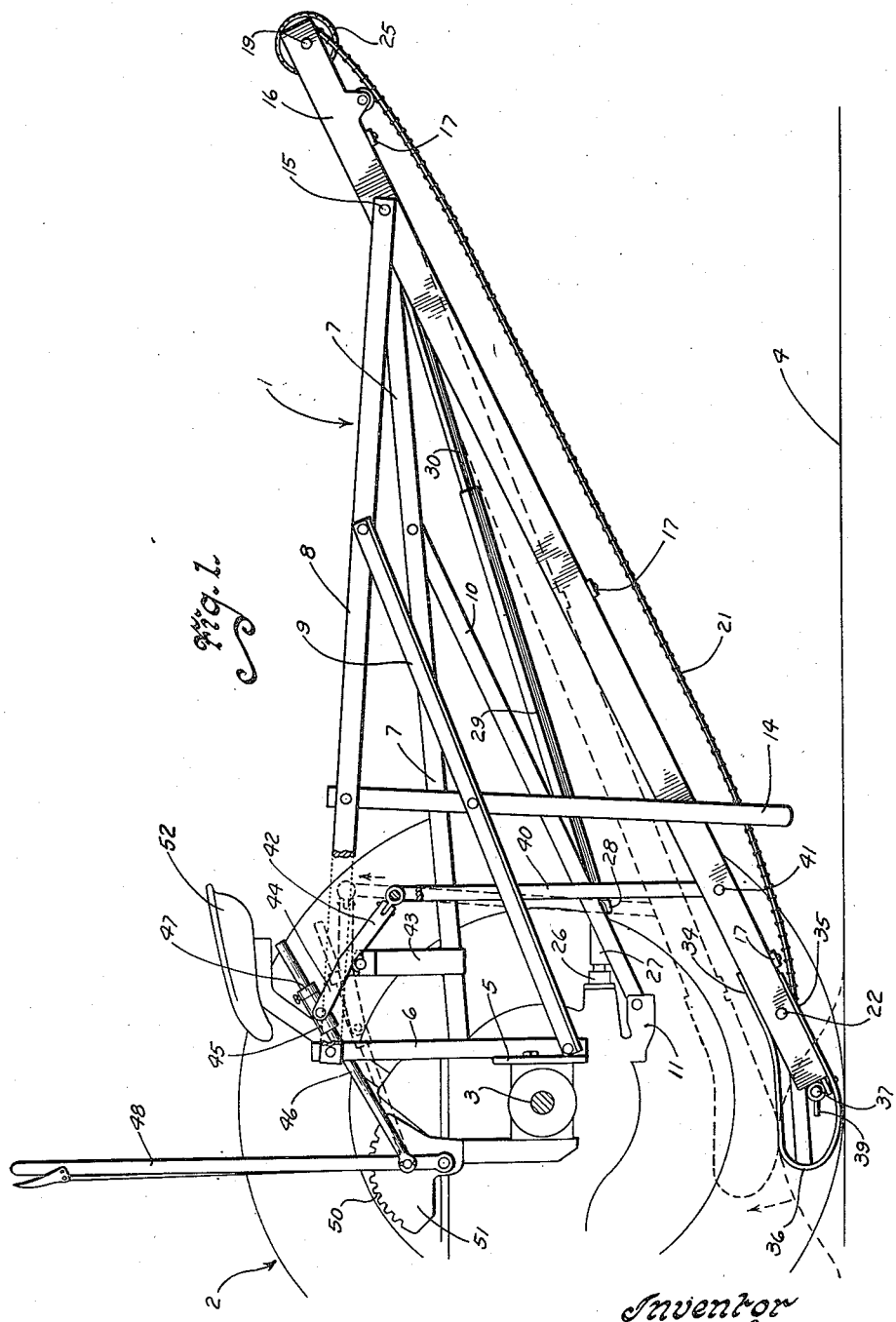
Figure 1 is a elevation view of the elevator and the rear of a tractor taken from the left side.

The elevator is shown generally at 1 and may be attached to any type tractor 2, such as a John Deere Row Crop tractor or any other model, with very little change in the elevator. One limiting factor however must be provided for namely, a bale of hay must pass between the rear axle 3 of a tractor 2 and the surface of the ground 4. Since a bale of hay is 16 by 18 inches in cross-section, the rear axle 3 must be of sufficient height above the surface of the ground 4 to allow the bale of hay to pass underneath the axle 3. The clearance needed is approximately 24 inches hence a tractor that does not have 24 inches clearance between the rear axle 3 and the surface of the ground 4 could not receive the present elevator 1.

As shown in Figure 2, the elevator 1 is attached to the rear of tractor 2 on the left side by a supporting structure. The main support of the supporting structure is provided by a plate 5 attached to the rear axle 3, with a vertical angle iron 6 extending upwardly and a main supporting angle iron 7 extending rearwardly from about the middle of the vertical member 6. An angle iron 8 (Figure 4) extends rearwardly from the top of the vertical member 6 while a third angle iron 9 extends rearwardly from the vertical member 6 and connects to the rearwardly extending member 8 to provide a reenforcing support for the member 8. An angle member 10 attaches at one end to the draw bar attachment 11 on the tractor 2 and the other end to the member 7 to provide a reenforcing for the member 7. An angle iron 12 attaches to the member 7 at about its mud-point and extends to the extreme right rear axle 3 where it is attached to add further reenforcing to the supporting structure.

A second vertical member 13 (Figure 2) is attached to the plate 5 on the extreme left side of the plate 5 and the angle irons forming the supporting structure, proceed rearwardly from the vertical member 13 the same as for the vertical member 6. Referring to Figure 1, the rearwardly extending members and reenforcing members are designated with the same numbers as their equivalents extending from the vertical member 6. The members 7, 8 and 9 are attached to a vertically extending angle iron 14 to provide further reenforcing for the supporting structure.

The supporting structure is attached at each side to the elevator 1 at the point 15 on each side of the elevator mechanism 1. The elevator is movably or pivotally attached to the supporting structure at this point. In attaching the elevator 1 and supporting structure to the tractor 2, the tractor 2 is backed into the elevator 1 and supporting structure. The operator then attaches the plate 5 by putting six cap screws into the rear axle 3. Side brace 12 is then attached to the extreme right rear axle 3 by one cap screw and braces 10 are each attached by a cap screw to the draw bar 11 and means to pivot the elevator mechanism 1 about the point 15 is attached to the rear axle 3 by two cap screws. It can be seen that the elevator 1 may be attached to a tractor 2 very easily and fifteen minutes at the most is all that is required to equip a tractor for operation. It takes much less time to remove the elevator 1 and supporting structure from the tractor 2 and five minutes is generally sufficient time.

The elevator 1 is of substantial length to elevate a bale of hay to a hay rack (not shown) and of a width to accommodate a bale of hay. The forward end rides on the surface of the ground and the rear end is elevated sufficiently to discharge a bale of hay onto a hay rack as previously stated, the elevator 1 pivotally attaches to the supporting structure about the pivot point 15. The elevator 1 has side portions 16 suitably held together with braces 17 with a backing 18 of any suitable material. Journaled in the side portions 16 at the top of the elevator 1 is a shaft 19 having two sprocket wheels 20 spaced and mounted thereon over which chains 21 pass. At the forward end of the elevator 1 is an idler shaft 22 journaled in the side portions 16 and having sprocket wheels 23 over which sprocket chains 21 pass. The sprocket chains 21 make an endless arrangement in that they are rotated by the shaft 19 and travel upwardly on the upper face of the elevator 1 and return downwardly on the under face of the elevator 1 and turn on the sprockets 23 on the idler shaft 22. Slats 24 extend between the sprocket chains 21 and each end of the slats 24 is attached to sprocket chains 21 to provide a support for a bale of hay being carried upwardly on the chains 21.

The top shaft 19 has a spur gear 25 attached to one end thereof to provide a means to rotate the shaft 19. The tractor 2 has a power take-off means 26 extending rearwardly from the tractor 2 with a short shaft 27 attached by a universal joint 28 (Figure 4) to a female shaft extension 29 in which a male shaft extension 30 may telescope to make the shaft adjustable longitudinally. To the male extension 30 is attached a second universal joint 31 and a short shaft member 32 with a spur gear 33 to mesh with the spur gear 25. The power take-off 26 operates when the tractor engine is running, hence the flexible shaft is also rotated and spur gears 25 and 33 rotate the shaft 19.

The forward end of the elevator 1 has a ground shoe to ride on the ground comprising two pieces of strap metal with the ends 34 and 35 bent parallel to each other so as to leave a semi-circular portion 36. The ends 34 and 35 are attached to the top and bottom of the side portions 16 to attach the ground shoe to the forward end of the elevator. The semi-circular portion 36 rides on the ground as the tractor 2 moves forwardly, the semi-circular portion adding resilience to absorb some of the shocks and guides the elevator over the rough ground.

A second shaft 37 is journaled within the forward end of the elevator 1 and is powered by a chain 38 connecting to idler shaft 22. The shaft 37 carries outwardly projecting vanes 39, best shown in Figure 6, which rotate with the shaft 37. The shaft 37 rotates at a medium speed and the vanes 39 contact a bale of hay, first to lift the bale of hay upwardly about one inch while pulling the bale of hay into the elevator at the same time. The shaft 37 and vanes 39 serve to be a guiding means to direct a bale of hay into the elevator 1 onto the slats 24 on the endless chain which support the bale and transport the bale up the elevator 1.

The tractor has means mounted thereon, in Figures 1 to 4 to lift the forward end of elevator 1 upwardly with respect to the surface of the ground about the pivot point 15. A vertical member 40 is attached to the forward end of the elevator at the point 41 which vertical member 40 in turn connects with the means on the tractor 2 to lift the forward end of the elevator 1 upwardly into the position shown in dotted lines in Figure 1. The upper end of the vertical member 40 attaches to one end 42 of a rocker member. The rocker member is pivotally mounted on a bracket 43 which bracket 43 is in turn attached to the member 7 of the supporting structure. The other end 44 of the rocker attaches to a sleeve 45. The sleeve 45 is slidably mounted on a rod 46. The rod 46 has a flange 47 held on the rod 46 by a set screw which limits the upward movement of the sleeve 45 on the rod 46 and the flange 47 may be adjusted on the rod 46. The rod 46 in turn is pivotally attached to a handle 48. The handle 48 has a projecting portion 49 which portion 49 may enter any one of a series of grooves 50 to hold the elevator 1 in any desired upward position. The grooves 50 are in a bracket member 51 mounted to the rear axle 3.

An operator seated on the seat 52 of the tractor 3 grasps handle 48, releases the projecting member 49 on the handle 48 from grooves 50 and moves the handle 48 either to left or right to raise or lower the elevator 1. The dotted lines of Figure 1 show the elevator in raised position while the solid lines show the elevator in lowered position. If the handle 48 is moved to the left, sleeve 45 contacts flange 47 and the rod 46 is pulled to the left and downwardly, rocking the rocker end 44 downward and end 42 upwardly on the bracket 43. The vertical member 40 is pulled upward and the elevator 1 pulled into the dotted line position of Figure 1. If the handle 48 is released, the elevator goes downwardly until the ground shoe 36 contacts the ground. The elevator 1 rides on the surface of the ground as the tractor 2 moves forwardly and pivots about the pin 15 as the tractor runs over uneven ground. If the tractor 2 is being taken to a field or used to pull a hay rack, the elevator 1 is raised to the dotted line position by Figure 1 so it will be out of the way with the surface of the ground and may be used as a pulling unit exclusively.

The forward end of the elevator 1 is approximately underneath the rear axle 3 so that a maximum space will be left between the rear axle 3 and the elevator 1 so a bale of hay will pass upwardly on the elevator 1 without wedging between the axle 3 and the elevator 1. A distance of 24 inches is needed and the slope of elevator 1 must be such that the end of the bale of hay will pass through. With the forward end of the elevator 1 directly beneath the rear axle 3 a maximum space is insured.

Referring to Figure 5 a tractor 2 is disclosed which comes equipped with a hydraulic power control 53 with a handle 54 for actuating the hydraulic power control 53. The hydraulic power control 53 may be used for many purposes in the use of a tractor, and in the present instance may be used to actuate the mechanism to lift the elevator 1. An arm 55 connects into the hydraulic power control 53 and is actuated by the hydraulic power control 53. One end of the rod 46 connects to the arm 55 and rod 46 is actuated in the same manner when handle 54 is moved to actuate the hydraulic power control 53 as when the handle 48 is actuated. All the other members are the same as for the hand operation.

It is to be understood that belts could be substituted for the sprocket chains 22 and the structure would operate the same.

It will be understood that the invention has been described for purposes of illustration and explanation and that changes and variations are possible without departing from the scope of the invention; all such modifications and changes are intended to be included in the appended claim.

I claim:

In a device of the class described, a frame designed to be secured to a supporting vehicle, an elevator mechanism hingedly secured by one of its ends to said frame, an elongated member hingedly secured by one of its ends to the other end of said elevator, a horizontal support member secured to said frame near the other end of said elongated member, a rigid member hingedly secured by one of its ends to the other end of said elongated member; said horizontal support member engaging said rigid member on its under side and intermediate of its ends, and a means for selectively applying a downward force of releasing downward pressure on the other end of said rigid member.

ROBERT F. COLLINS.

REFERENCES CITED

The following references are of record in the file of this patent:

UNITED STATES PATENTS

| Number | Name | Date |
|---|---|---|
| 930,719 | Battee | Aug. 10, 1909 |
| 2,400,086 | Hansen | May 14, 1946 |
| 2,404,629 | Griff | July 23, 1946 |
| 2,418,575 | Christiansen | Apr. 8, 1947 |
| 2,427,324 | Farr et al. | Sept. 9, 1947 |
| 2,432,956 | Walz | Dec. 16, 1947 |
| 2,460,441 | Appel | Feb. 1, 1949 |
| 2,477,389 | Oehler | July 26, 1949 |